United States Patent
Rodriguez

Patent Number: 6,118,923
Date of Patent: *Sep. 12, 2000

[54] METHOD AND APPARATUS FOR DEFERRED SELECTIVE VIEWING OF TELEVISED PROGRAMS

[75] Inventor: Tony Rodriguez, Portland, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/850,949

[22] Filed: May 5, 1997

Related U.S. Application Data

[63] Continuation of application No. 08/337,094, Nov. 10, 1994, abandoned.

[51] Int. Cl.[7] .................................................. H04N 5/91
[52] U.S. Cl. .............................................. 386/69; 386/95
[58] Field of Search .................................. 386/83, 46, 1, 386/69, 70, 81, 82, 125, 126, 95; 348/906, 7, 563, 731, 732, 564; 364/514 A; 360/33.1, 69; 455/186.1

[56] References Cited

U.S. PATENT DOCUMENTS

| | | | |
|---|---|---|---|
| 4,342,095 | 7/1982 | Goodman | 364/900 |
| 4,706,121 | 11/1987 | Young | 358/142 |
| 4,839,743 | 6/1989 | Best et al. | 386/31 |
| 5,353,121 | 10/1994 | Young et al. | 348/563 |
| 5,404,316 | 4/1995 | Klingler et al. | 364/514 |
| 5,428,774 | 6/1995 | Takahashi et al. | 386/68 |
| 5,497,240 | 3/1996 | Yoo | 360/33.1 |
| 5,499,050 | 3/1996 | Baldes et al. | 348/180 |
| 5,499,103 | 3/1996 | Mankovitz | 386/96 |
| 5,521,841 | 5/1996 | Arman et al. | 364/514 A |
| 5,543,929 | 8/1996 | Mankovitz et al. | 386/46 |
| 5,546,191 | 8/1996 | Hibi et al. | 348/564 |
| 5,621,579 | 4/1997 | Yuen | 386/121 |
| 5,635,978 | 6/1997 | Alten et al. | 348/7 |
| 5,640,484 | 6/1997 | Mankovitz | 386/83 |
| 5,859,662 | 1/1999 | Cragun et al. | 348/13 |

Primary Examiner—Thai Tran
Assistant Examiner—Aung S. Moe
Attorney, Agent, or Firm—Blakely, Sokoloff, Taylor & Zafman LLP

[57] ABSTRACT

A computer system equipped with certain hardware and software is provided for recording televised programs, and at the same time constructing tables of complementary video indices into the recorded televised programs, based on story lines, story characters and the like of the televised programs, thereby allowing the recorded televised programs to be defer viewed in a selective manner using the complementary video indices. The computer system, in addition to conventional hardware/software elements, further includes a video digitizer, a video embedded information decoder, a video user interface, a video index builder, a video viewer, a video index retriever, and a driver module.

30 Claims, 6 Drawing Sheets

| INDEX KEY | STARTING FRAME | ENDING FRAME |
|---|---|---|
| Character A | F1 | F2 |
| Character B | F3 | F4 |
| ⋮ | | |
| Character A | F5 | F6 |
| ⋮ | | |
| Character A | F7 | F8 |
| ⋮ | | |

*Figure 3*

METHOD AND APPARATUS FOR DEFERRED SELECTIVE VIEWING OF TELEVISED PROGRAMS

This is a continuation of application Ser. No. 08/337,094, filed Nov. 10, 1994, now abandoned.

BACKGROUND OF THE INVENTION

1. Field of the Invention

The present invention relates to the field of televised programs recording and playback. More specifically, the present invention relates to method and apparatus for deferred selective viewing of televised programs.

2. Background Information

Today, virtually every household in the U.S. has at least one television set (TV) and a video cassette recorder (VCR). One popular usage of the VCR is to record televised programs for deferred viewing. Televised programs are recorded for deferred viewing for a variety of reasons. Sometimes it is because the programs are broadcast during work hours, other times it is because the programs are broadcast at the same time other programs that are of equal interest are being broadcast. The kind of programs VCR owners record also run a full gamut from sport programming to day time soap operas. The televised programs may be recorded off a cable system, directly from the air wave or even directly from satellite transmission. Typically, at a later convenient time, VCR owners would then rewind the recording cassettes, and play back the recorded televised programs for viewing.

This prior art manner of recording televised programs for deferred viewing has a number of disadvantages. First and foremost, the capability for selective viewing is virtually non-existing. The only "selective viewing" capability available is to play back the recorded program, and fast forward on the segments that are of no interest. Often times, a viewer may find himself and herself spending a substantial amount of time in fast forwarding just to see a few short segments of the recorded program that are of interest. For example, a football fan might find himself/herself fast forwarding most of a three hour long recording of a defense dominated ball game that is of no interest to him/her, just to see a few exciting third down plays. As another example, worst yet, a soap opera fan might find himself/herself fast forwarding an entire hour of recording to find out that the character most interested to him/her was not involved in any of the scenes in today's broadcast.

Thus, it is desirable to be able to defer view televised programs in a more selective manner. Since the medium of delivery for televised programs, the number of channels, and the amount of programming are expected to continue to increase in an ever more rapid rate, the ability to defer view televised programs in a selective manner is expected to become even more desirable. The recent advances in desktop computing technology and its merging with television technology have created an opportunity to overcome the disadvantages of the prior art manner of deferred viewing televised programs. As will be disclosed in more details below, the present invention, exploiting recent advances in computing and television technology, provides for such an improved method and apparatus for deferred selective viewing of televised programs that achieves these and other desired results.

SUMMARY OF THE INVENTION

The desired results are advantageously achieved by providing a computer system equipped with certain hardware and software for recording televised programs, and at the same time constructing tables of complementary video indices into the recorded televised programs, based on story lines, story characters and the like of the televised programs, thereby allowing the recorded televised programs to be defer viewed in a selective manner using the complementary video indices.

More specifically, the computer system, in addition to conventional components such as processor and storage devices, is equipped with a video digitizer and a video embedded information decoder. Furthermore, the computer system, in addition to conventional software elements such as operating system, window subsystem, database manager and application support environment/libraries, is equipped with a number of complementary application elements including an user interface, a video index builder, a video viewer, a video index retriever, and a driver module.

At recording time, the video digitizer receives and digitizes a televised program. The video embedded information decoder receives the same televised program and decodes the embedded information. The video index builder constructs the complementary video indices using the decoded information. The storage devices store the digitized televised programs, if any, and the complementary video indices.

At a deferred viewing time, the video viewer in cooperation with the video index retriever selectively plays back the recorded televised programs responsive to user selections communicated via interactions with the user interface, and through the driver module.

The user interface facilitates inputs such as recording time, indexing and viewing selections from the user, as well as outputs such as selective video play back for the user. The driver module selectively drives the video digitizer, the video embedded information decoder, the index builder, and the video viewer, responsive to user interactions with the user interface.

In one embodiment, the video embedded information decoder is a close caption decoder for decoding embedded close caption information. In another embodiment, the video embedded information decoder is a video indexing protocol decoder for decoding embedded information in the vertical blanking intervals in accordance to a video indexing protocol.

BRIEF DESCRIPTION OF DRAWINGS

The present invention will be described by way of exemplary embodiments, but not limitations, illustrated in the accompanying drawings in which like references denote similar elements, and in which:

FIG. 3 illustrates one embodiment of the complementary video indices;

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
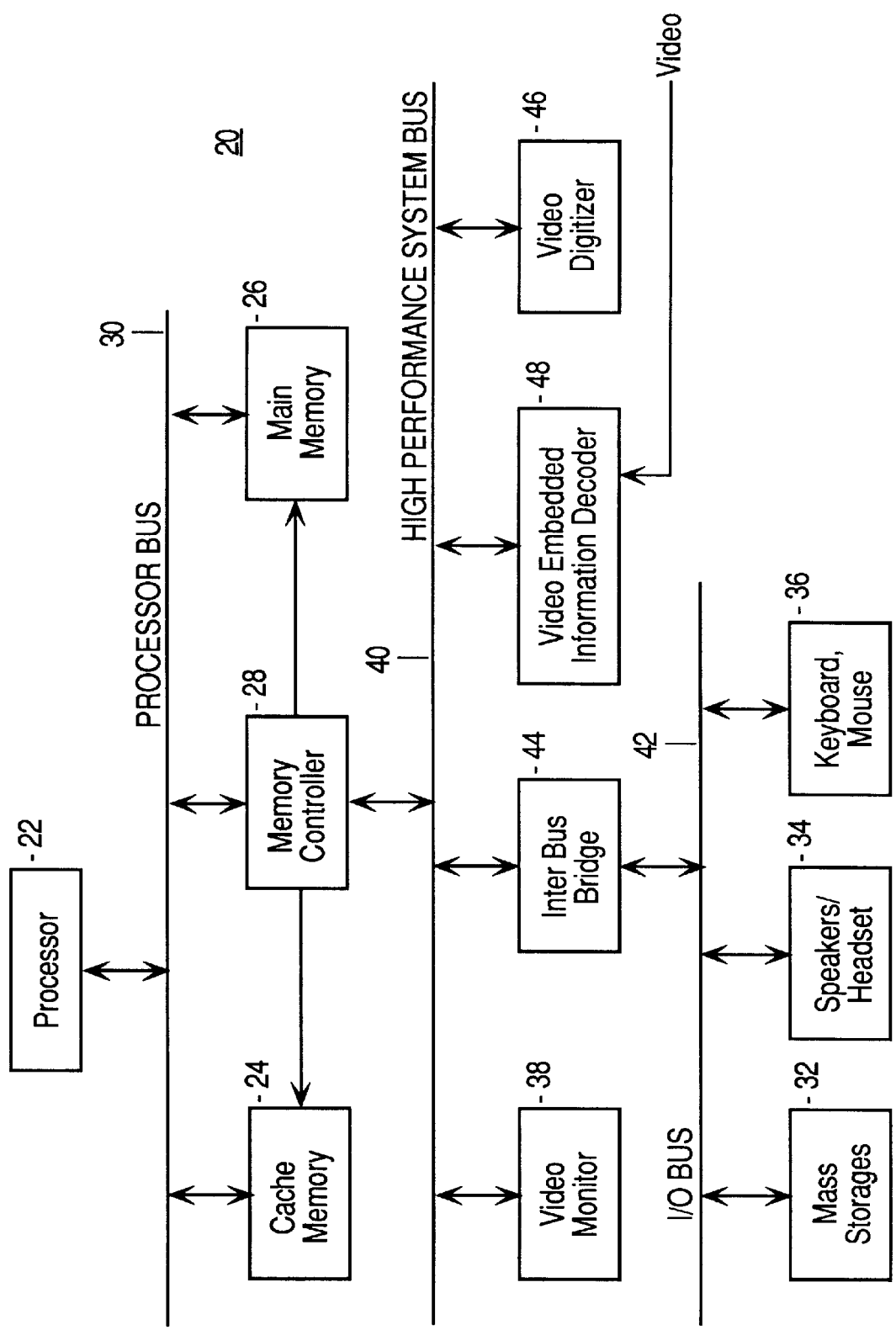
FIG. 1 illustrates an exemplary computer system incorporated with teachings of the present invention.

Referring now to FIG. 1, a block diagram illustrating an exemplary computer system 20 incorporating the teachings of the present invention is shown. Exemplary computer system 20 comprises processor 22, cache memory 24, main memory 26, memory controller 28, and processor bus 30 coupled to each other as shown. Exemplary computer system 20 further comprises mass storages 32, speakers/headset 34, keyboard/mouse 36, video monitor 38, high performance system bus 40, I/O bus 42, inter-bus bridge 44, coupled to each other as shown. Memory controller 28 is also coupled to high performance system bus 40. Lastly, in accordance to the teachings of the present invention, exemplary computer system 20 further comprises a video digitizer 46 and a video embedded information decoder 48 coupled to high performance system bus 40 as shown.

Processor 22 is intended to represent a broad category of high performance processor elements found in many computer systems including but not limited to the Pentium™ processor manufactured by Intel Corp. of Santa Clara, assignee of the present invention. Except for the manner it is used under the teachings of the present invention, the constitution and functions of processor 22 are well known, and will not be otherwise further described.

Cache and main memory 24 and 26 are provided with sufficient capacity to store the required software elements and video data during operation. Similarly, mass storages 32 are provided with sufficient capacity to store digitized televised programs and their complementary video indices. Otherwise, cache and main memory 24 and 26, and mass storages 32 are also intended to represent a broad category of these elements found in many computer systems. Their constitution and functions are also well known, and will not be further described either.

Video digitizer 46 in accordance to the present invention receives and digitizes televised programs, responsive to recording timing inputs received. A particular example of suitable video digitizer includes the Intel Smart Video Recorder (ISVR) add-on board manufactured by Intel. Televised programs may run the full gamut from sport programming to soap operas. Televised programs may be received from a cable system, over the air wave, or from satellite transmission. The manner in which video digitizer 46 cooperates with other elements of the present invention, including the manner in which the digitized televised programs are defer viewed selectively, will be described in more detail below.

Video embedded information decoder 48 in accordance to the present invention receives the televised programs, and decodes information embedded in the vertical blanking intervals of the televised video, responsive also to recording timing inputs received. In one embodiment, video embedded information decoder 48 is a close caption decoder for decoding close captions embedded in vertical blanking intervals. A particular example of suitable close caption encoder is the closed caption decoder manufactured by EEG Enterprises Inc., of Farmingdale, N.Y. In another embodiment, video embedded information decoder 48 is a video indexing protocol decoder for decoding information encoded in vertical blanking intervals in accordance to a video index protocol. A particular example of video index protocol is disclosed in copending U.S. patent application Ser. No. 08/328,871, entitled Video Indexing Protocol, filed on Oct. 24, 1994, assigned to the assignee of the present invention which has now been abandoned in favor of continuation application Ser No. 08/701,038. The manner in which video embedded information decoder 48 cooperates with other elements of the present invention, including the manner in which the decoded information are used to build complementary video indices into the "recorded" televised video for subsequent selective retrieval, will also be described in more detail below.

Memory controller 28, processor bus 30, and the other conventional elements 34–44 are also intended to represent a broad category of like elements found in many computer systems. Except for the manner it is used under the teachings of the present invention, the constitution and functions of these elements 34–44 are also well known, and will not be otherwise further described either.

While the present invention is being described with video digitizer 46 and mass storages 32 for digitizing and storing the digitized the televised program, a person skilled in the art will appreciate that the present invention may also be practiced with a VCR instead. Similarly, while the present invention is being described with decoder 48 that decodes information embedded in vertical blanking intervals, based on the description to follow, it will be appreciated by those skilled in the art that the present invention may be practiced with other "decoders", such as image detector, letter character recognizer, speech recognizer and the like, which "decodes" and identifies the presence of certain story characters or story lines in the televised programs being recorded.

Figure 2:
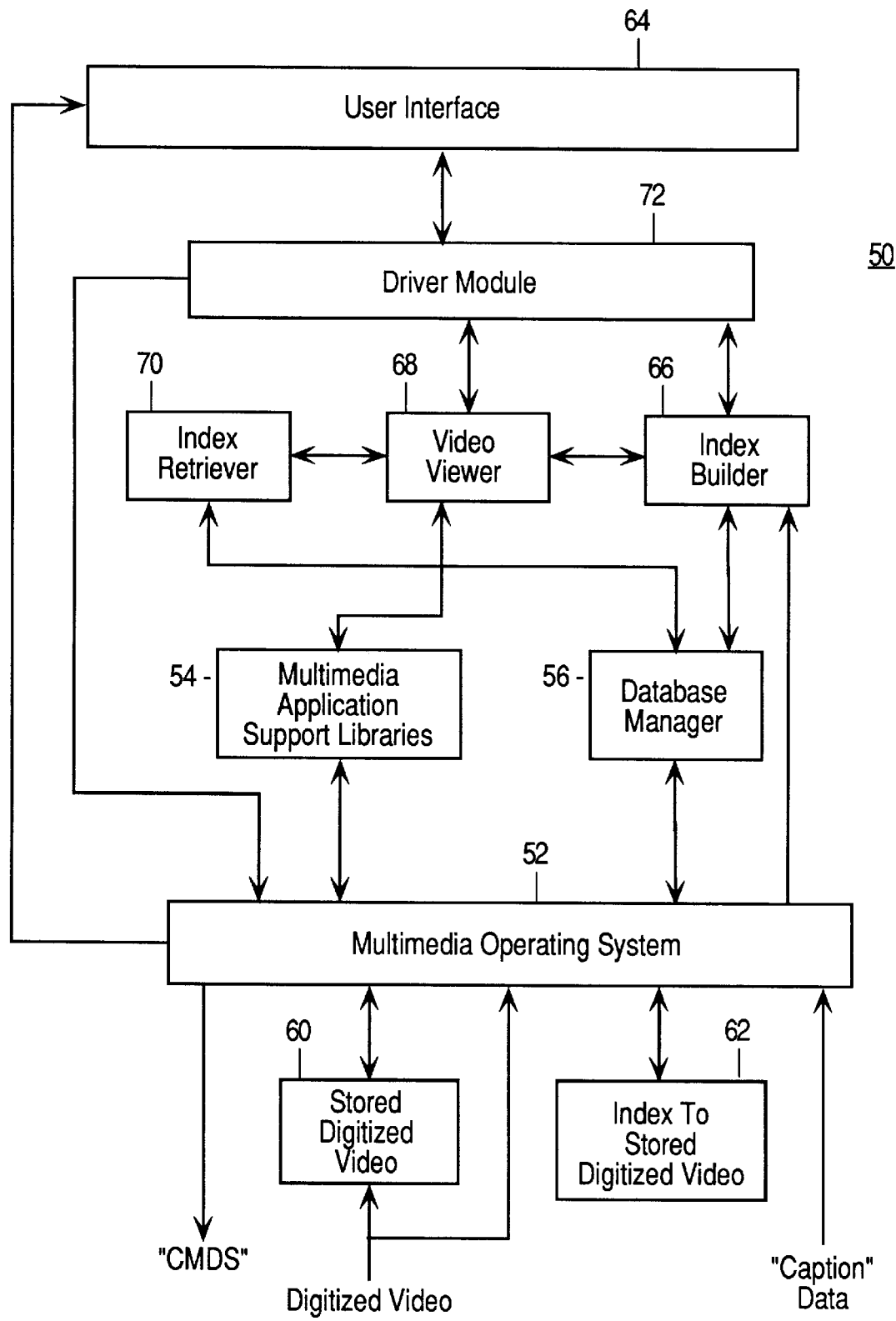
FIG. 2 illustrates one embodiment of the essential software elements of the exemplary computer system of FIG. 1.

FIG. 2 illustrates one embodiment of the essential software elements 50 of exemplary computer system 20. As shown, the essential software elements 50 include multi-media enabled operating system 52, multi-media enabled application support environment/libraries 54, and database manager 56. In accordance to the present invention, essential software elements 50 further include stored digitized video 60, complementary video indices into the stored digitized video 62, user interface 64, video index builder 66, video viewer 68, video index retriever 70, and driver module 72.

Multi-media enabled operating system 52 provides operating system services including multi-media device input/output services. Suitable multi-media enabled operating system 52 includes but not limited to Window™ developed by Microsoft Inc. of Redmond, Wash. Multi-media enabled application support environment/libraries 54 provides application support services include multi-media logical services. Suitable multi-media enabled application support environment/libraries 54 includes but not limited to Visual Basic developed also by Microsoft Inc. Database manager 56 provides data base management services. Suitable database manager 56 includes but not limited to Access® developed by Microsoft Inc. The manner these elements 52–56 are used under the present invention will be described in more detail below.

As described earlier, digitized video 60 are generated by video digitizer 46. Complementary video indices 62 are built by video index builder 66 using the decoded embedded information output by decoder 48. Both the digitized video 60 and the complementary video indices 62 are stored in storage devices 32. In an embodiment where Microsoft Window™ and Access® are employed as operating system 52 and database manager 56 respectively, digitized video 60 is an AVI file and complementary video indices 62 is a MDB file. The content of an AVI file is well known to those skilled in the art. The organization of complementary video indices 62 will be described in more detail below.

Video index builder 66 builds complementary video indices 62 using the decoded embedded information output by decoder 48, and in accordance to indexing key information such as story lines and story characters received. Video viewer 68, in cooperation with video index retriever 70, selectively plays back stored digitized video 60, using complementary video indices 62, in accordance to playback selections received. Driver module 72 provides video digitizer 46 and decoder 48 with recording timing inputs, video index builder 66 with indexing keys, and video viewer 68 with playback selections, responsive to user inputs received. User interface 64 facilitates provision of user inputs to driver module 72. In the above described Microsoft Window™ based embodiment, video index builder 66, video viewer 68, video index retriever 70 and driver module 72 are Window™ applications, whereas user interface 64 is a collection of windows. The basic implementation of these application software elements 64–72 are readily apparent to those skilled in the art. Nevertheless, certain essential aspects of these application software elements 64–72 will be described in more detail below.

FIG. 3 illustrates one embodiment of complementary video indices 62. As shown, in this embodiment, digitized video 60 is indexed based on the story characters. Complementary video indices 62 comprise one index entry 82 for each scene instance of each story character. For example, as illustrated, "Char A" appears in a "scene" starting from frame F1 and ending in frame F2, another "scene" starting from frame F5 and ending in frame F6, etc. Similarly, as a further example, "Char B" is part of a "scene" starting from frame F3 and ending in frame F4. It should be noted that a "scene" is a loosely defined notion without strict frame boundaries. In other words, for the illustrated examples, the range F3–F4 might be disjointed, coincide, or overlap with the range F1–F2.

Figure 4:
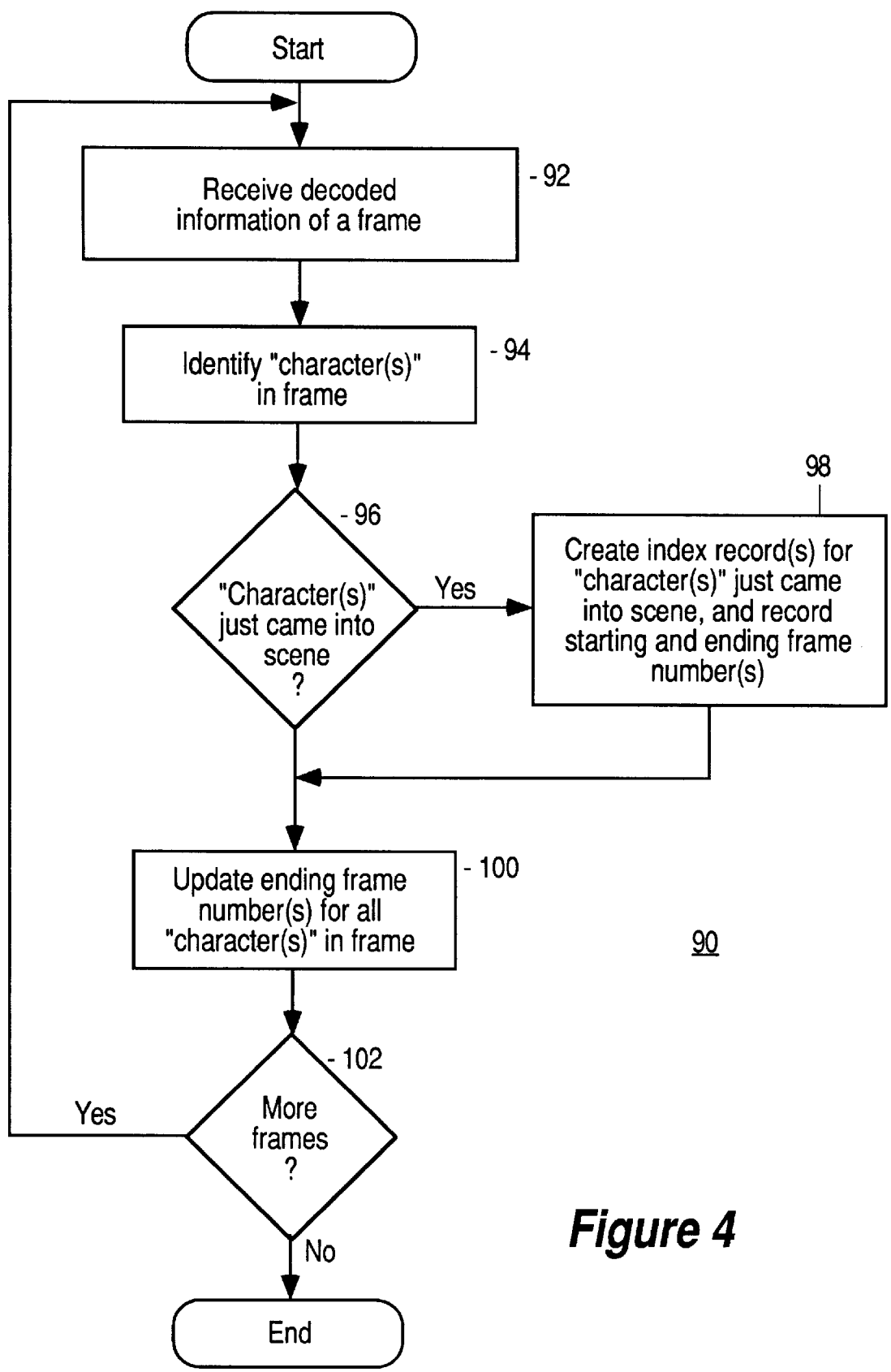
FIG. 4 illustrates the index building method steps of one embodiment of video index builder.

FIG. 4 illustrates an embodiment of the index building method steps of video index builder 66. As shown, video index builder 66 receives decoded information of a frame from decoder 48, step 92. Video index builder 66 examines the decoded information, and identifies the indexing keys such as story lines or story characters contained in the frame, step 94. For each indexing key that is contained in the frame being examined, video index builder 66 determines if the indexing key has just came into the current "scene", step 96. An indexing key has just came into the current "scene" if the indexing key has never appeared since the beginning of the current recording session or it has been absent for a predetermined extended time period. An indexing key has never appeared if no index entries have ever been created for the indexing key since the start of the current recording session, and the indexing key has been absent for the predetermined extended time period if the difference between the ending frame number of the last index entry for the indexing key and the current frame number is greater than a predetermined threshold.

If an indexing key such as a story line or a story character just become part of the current "scene", step 96, video index builder 66 creates a new index entry for each of the newly appeared indexing key, and records the current frame number as the starting and ending frame numbers for each index entry, step 98. On the other hand, if the indexing key did not just become part of the current "scene", step 96, video index builder 66 increments the ending frame number of its last index entry, step 100.

Video index builder 66 repeats steps 92–100, until it determines at step 102 that there are no more frames to be examined, i.e., the end of the current recording session has been reached.

It should be noted that the threshold for defining an indexing key as being absent, in general, should be generously set, to accommodate situations where the indexing key comes in and out of the current scene. Doing so would also has the practical benefit of reducing the number of index entries 82.

Figure 5:
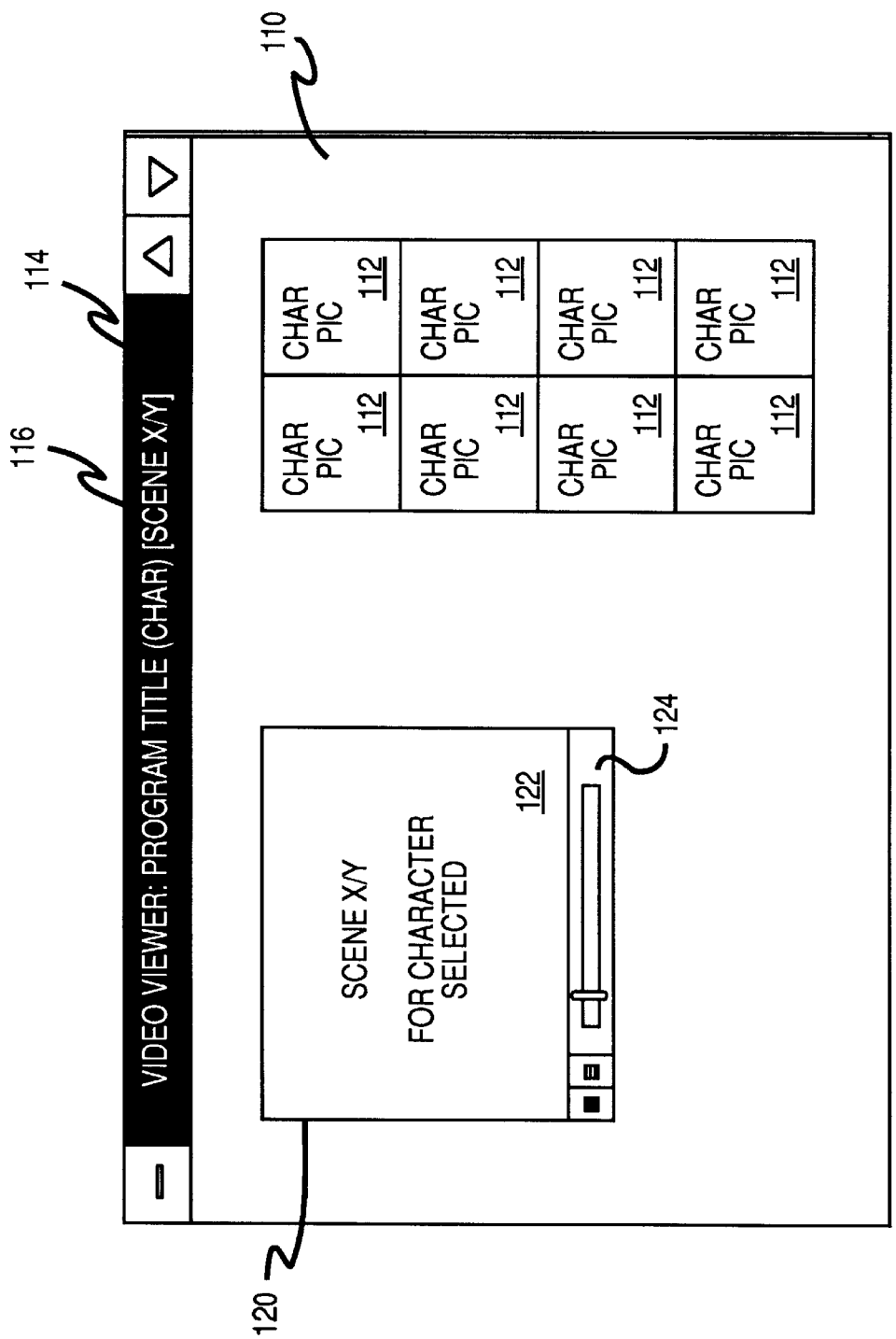
FIG. 5 illustrates two essential windows of one embodiment of user interface.

FIG. 5 illustrates two essential windows of one embodiment of user interface 64. As shown, user interface 64 comprises a first window 110 for displaying and soliciting user viewing selections, and a second window 120 for selectively playing back the recorded video. For the illustrated embodiment, first window 110 includes the indexed story characters in pictures/icons 112. Selection is indicated by the user moving the cursor onto one of the displayed story character pictures/icons, and clicking a selection button, using mouse 36. As will be appreciated by those skilled in the manner, other manners of selection including combination selections, i.e., multiple indexed story characters, may be implemented. Additionally, under the illustrated embodiment, first window 110 further includes a title bar 114 that can be updated with the current scene number and the total number of scenes the selected indexed story character appears in.

For the illustrated embodiment, second window 120 includes a pane 122 on which the selected playbacks are shown, and a number of control icons for controlling brightness of the video and volume of the audio rendered, etc.

Figure 6:
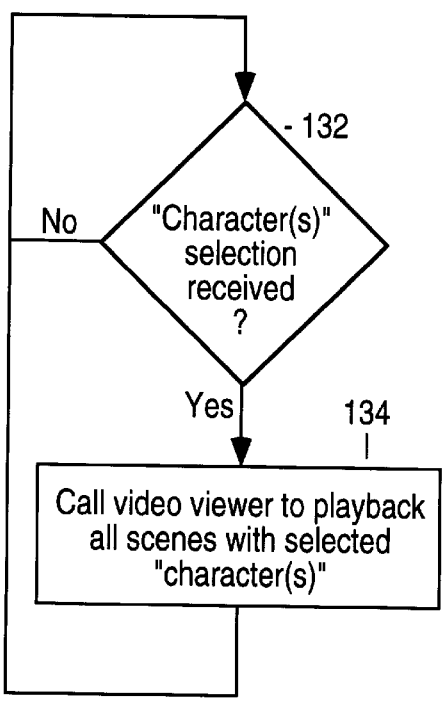
FIG. 6 illustrates the play back method steps of driver module.

FIG. 6 illustrates one embodiment of the playback method steps of driver module 72. As shown, under this embodiment, driver module 72 monitors for user playback selections. Upon receiving user playback selections, step 132, driver module 72 invokes video viewer 68 to play back all scenes of the recorded televised program having the playback selection, and provides video viewer 68 with the playback selection information, step 134.

Figure 7:
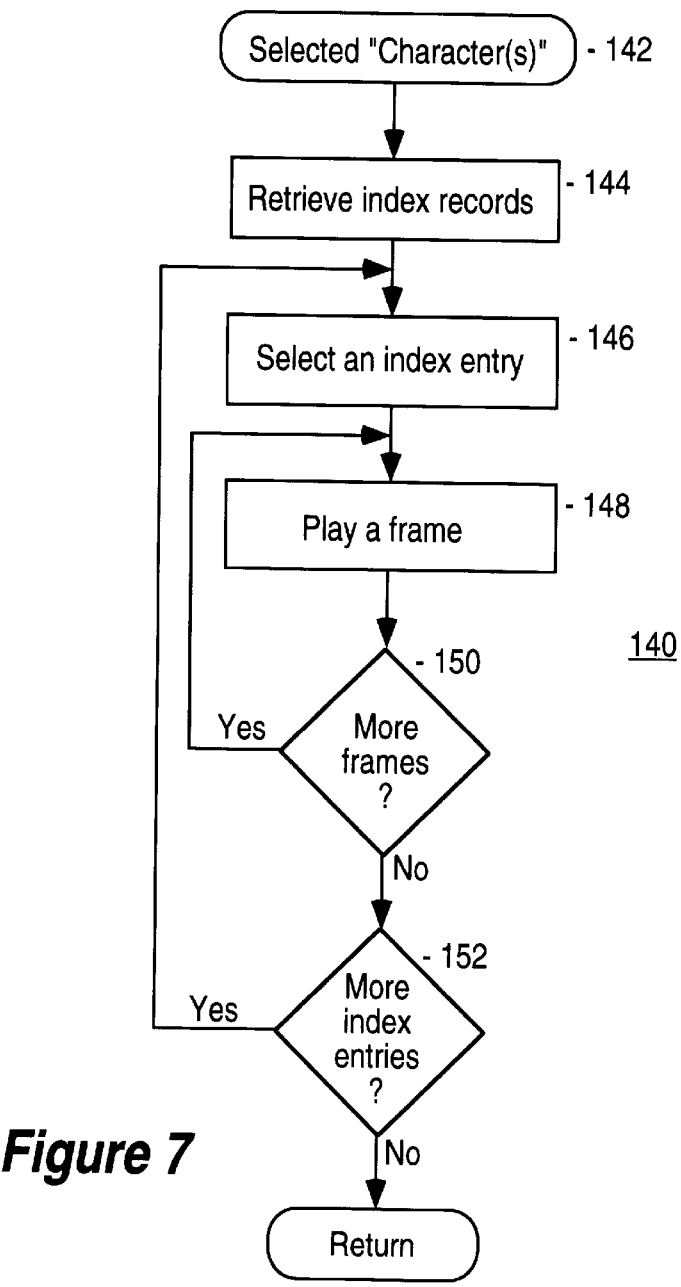
FIG. 7 illustrates the play back method steps of video viewer.

FIG. 7 illustrates one embodiment of the playback method steps of video viewer 68. As shown, under this embodiment, upon invocation and receipt of user playback selections, step 142, video viewer 68 uses index retriever 70 to retrieve the index entries for the selected playback indexing keys, i.e., selected story lines or story characters, step 144. As will be appreciated by those skill in the art, step 144 is merely employed to free driver module 72 from the details of retrieving indices.

Upon retrieving the relevant index entries, step 144, video viewer 68 selects a first index entry, typically the first index entry, step 146, and calls the multi-media services of the application support environment/libraries 54 to play a frame, typically the first frame, step 148. Video viewer 68 repeats step 148 until it determines at step 150 that all frames indexed by the selected index entry have been played. Next, video viewer 68 repeats steps 146 and 150 until it determines at step 152 that all scenes indexed by the retrieved index entries have been played.

Thus, a method and apparatus for deferred selective viewing of televised programs has been described. While the methods and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:
   means for decoding closed caption embedded in a current frame of a televised program being recorded;
   means for identifying from zero to N characters present in the current frame based on the closed caption;
   means for creating a new complementary video index entry for each character, if any, among the zero to N characters identified in the current frame for which a complementary video index entry does not exist in association with a frame immediately prior to the current frame in the televised program, each new complementary video index entry comprising a respective character identifier, and a starting frame number and an ending frame number both equivalent to a frame number of the current frame; and
   means for updating an ending frame number for characters, if any, among the zero to N characters identified in the current frame, as well as additional characters, if any, identified within a particular number of frames prior to the current frame, for which a complementary video index entry does exist in association with the frame immediately prior to the current frame.

2. The apparatus as set forth in claim 1, wherein said means for creating a new complementary video index entry comprises:
   execution means for executing programs;
   video index builder means executed by said execution means for building the each new complementary video index entry.

3. The apparatus as set forth in claim 1, wherein the apparatus further comprises means for receiving and recording the televised program.

4. The apparatus as set forth in claim 3, wherein said means for receiving and recording the televised program comprises:
   means for receiving and digitizing the televised program; and
   means for storing the digitized televised program.

5. The apparatus as set forth in claim 4, wherein said means for receiving and digitizing the televised program comprises an Intel Smart Video Recorder (ISVR).

6. The apparatus as set forth in claim 1, wherein the apparatus further comprises means for selective play back of the recorded televised program for selected characters using the complementary video index entries.

7. The apparatus as set forth in claim 6, wherein said means for selective play back of the digitized televised program comprises:
   execution means for executing programs;
   index retrieving means executed by said execution means for retrieving complementary video index entries corresponding to the selected characters; and
   video viewing means executed by said execution means, and in cooperation with said index retrieving means, for selective play back of scenes indexed by the retrieved complementary video index entries.

8. The apparatus as set forth in claim 7, wherein said means for selective play back of the digitized televised program further comprises driving means executed by said execution means for providing said video viewing means with the selected characters.

9. The apparatus as set forth in claim 8, wherein said means for selective play back of the digitized televised program further comprises user interface means displayed by said execution means for soliciting and communicating character selections to said driver means.

10. The apparatus of claim 1 wherein the starting and ending frame numbers are either both frame numbers or one frame number and one offset number.

11. A method comprising:
    decoding closed caption embedded in a current frame of a televised program being recorded;
    identifying from zero to N characters present in the current frame based on the closed caption;
    creating a new complementary video index entry for each character, if any, among the zero to N characters identified in the current frame for which a complementary video index entry does not exist in association with a frame immediately prior to the current frame in the televised program, each new complementary video index entry comprising a respective character identifier, and a starting frame number and an ending frame number both equivalent to a frame number of the current frame; and
    updating an ending frame number for characters, if any, among the zero to N characters identified in the current frame, as well as additional characters, if any, identified within a particular number of frames prior to the current frame, for which a complementary video index entry does exist in association with the frame immediately prior to the current frame.

12. The method as set forth in claim 11, wherein the decoding further comprises receiving and recording the televised program.

13. The method as set forth in claim 12, wherein receiving and recording the televised program comprises receiving and digitizing the televised program, and storing the digitized televised program.

14. The method as set forth in claim 11, wherein the method further comprises selectively playing the recorded televised program for selected characters using the complementary video index entries.

15. The method as set forth in claim 14, wherein the selectively playing comprises retrieving complementary video index entries corresponding to the selected characters and playing back scenes indexed by the retrieved complementary video index entries.

16. The method as set forth in claim 15, wherein the selectively playing further comprises receiving the selected characters.

17. The method as set forth in claim 16, wherein the selectively playing further comprises soliciting character selections from a user and sending the character selections.

18. The method of claim 11 wherein the starting and ending frame numbers are either both frame numbers or one frame number and one offset number.

19. A computer system comprising:
    decoding means for decoding closed caption embedded in a current frame of a televised program being recorded;
    identifying means for identifying from zero to N characters present in the current frame based on the closed caption;
    execution means coupled to the decoding means for executing programs;
    indexing means to be executed by the execution means for creating a new complementary video index entry for each character, if any, among the zero to N characters identified in the current frame for which a complementary video index entry does not exist in association with a frame immediately prior to the current frame in the televised program, each new complementary video index entry comprising a respective character identifier, and a starting frame number and an ending frame number both equivalent to a frame number of the current frame, and for updating an ending frame number for characters, if any, among the zero to N characters identified in the current frame, as well as additional characters, if any, identified within a particular number of frames prior to the current frame, for which a complementary video index entry does exist in association with the frame immediately prior to the current frame.

20. The computer system as set forth in claim 19, wherein the computer system further comprises recording means coupled to the execution means for receiving and recording the televised program.

21. The computer system as set forth in claim 20, wherein said recording means comprises:

digitization means coupled to the execution means for receiving and digitizing the televised program; and second storage means coupled to the digitization means for storing the digitized televised program.

22. The computer system as set forth in claim 17, wherein the computer system further comprises playback means to be executed by the execution means for selectivelyplay back the recorded televised program for selected ones of the intra-program indexing keys using the complementary video index entries.

23. The computer system as set forth in claim 19, wherein the computer system further comprises playback means to be executed by the execution means for selective play back of the recorded televised program for selected characters using the complementary video index entries.

24. The computer system as set forth in claim 23, wherein said playback means comprises:

index retrieving means to be executed by said execution means for retrieving the complementary video index entries for one or more selected characters; and video viewing means to be executed by said execution means, and in cooperation with said index retrieving means, for selective play back of scenes indexed by the complementary video index entries.

25. The computer system as set forth in claim 24, wherein said playback means further comprises driving means to be executed by said execution means for providing said video viewing means with the selected characters.

26. The computer system as set forth in claim 25, wherein said playback means further comprises user interface means displayed by said execution means for soliciting and communicating character selections to said driver means.

27. An apparatus comprising:

a decoder to decode closed caption embedded in a current frame of a televised program being recoded;

an identification unit to identify from zero to N characters present in the current frame based on the closed caption;

an indexer to create a new complementary video index entry for each character, if any, among the zero to N characters identified in the current frame for which a complementary video index entry does not exist in association with a frame immediately prior to the current frame in the televised program, each new complementary video index entry comprising a respective character identifier, and a starting frame number and an ending frame number both equivalent to a frame number of the current frame; and an updating unit to update an ending frame number for characters, if any, among the zero to N characters identified in the current frame, as well as additional characters, if any, identified within a particular number of frames prior to the current frame, for which a complementary video index entry does exist in association with the frame immediately prior to the current frame.

28. The apparatus of claim 27 wherein the starting and ending frame numbers are either both frame numbers or one frame number and one offset number.

29. An article comprising:

a storage medium; and a plurality of instructions stored on the storage medium that, when executed by a processor, result in decoding closed caption embedded in a current frame of a televised program being recorded;

identifying from zero to N characters present in the current frame based on the closed caption;

creating a new complementary video index entry for each character, if any, among the zero to N characters identified in the current frame for which a complementary video index entry does not exist in association with a frame immediately prior to the current frame in the televised program, each new complementary video index entry comprising a respective character identifier, and a starting frame number and an ending frame number both equivalent to a frame number of the current frame; and updating an ending frame number for characters, if any, among the zero to N characters identified in the current frame, as well as additional characters, if any, identified within a particular number of frames prior to the current frame, for which a complementary video index entry does exist in association with the frame immediately prior to the current frame.

30. The article of claim 29 wherein the starting and ending frame numbers are either both frame numbers or one frame number and one offset number.

* * * * *